Nov. 24, 1970  G. R. MACHLAN  3,542,674

METHOD FOR REMOVING SOLIDS SUSPENSIONS IN LIQUIDS

Filed July 22, 1968  3 Sheets-Sheet 1

INVENTOR.
GEORGE R. MACHLAN
BY
*Staelin & Overman*
ATTORNEYS

Nov. 24, 1970  G. R. MACHLAN  3,542,674
METHOD FOR REMOVING SOLIDS SUSPENSIONS IN LIQUIDS
Filed July 22, 1968  3 Sheets-Sheet 2

INVENTOR.
GEORGE R. MACHLAN
BY
Staelin + Overman
ATTORNEYS

United States Patent Office 3,542,674
Patented Nov. 24, 1970

3,542,674
METHOD FOR REMOVING SOLIDS SUSPENSIONS IN LIQUIDS
George R. Machlan, Newark, Ohio, assignor to Owens-Corning Fiberglas Corporation, a corporation of Delaware
Continuation-in-part of application Ser. No. 670,373, Sept. 25, 1967. This application July 22, 1968, Ser. No. 746,591
Int. Cl. C02b 1/20
U.S. Cl. 210—42          21 Claims

ABSTRACT OF THE DISCLOSURE

Removal of solids suspended in liquids by the flocculation of the solids in situ in a bed of fibers having a pore size more than approximately 10 times that of the smallest particles being removed. The fibers have a zeta potential which causes the solids of the suspension to floc when under the influence of the zeta potential of the fibers.

CROSS-REFERENCES TO RELATED APPLICATIONS

The present application is a continuation-in-part application of my copending application Ser. No. 670,373, filed Sept. 25, 1967, and now abandoned.

BACKGROUND OF THE INVENTION

The usual method of removing solids suspended in liquids is to filter the material through a sand bed and the like having a pore size which is less than the size of the particles being removed. In those instances where colloidal size particles, smaller than the pore size of the sand bed are to be removed, a coagulating agent has been used to produce a floc which entrains the colloidal particles so that the particles of floc which entrain the solids can be filtered out on the sand bed. One difficulty involved in the use of sand beds and the like, is that a pore of the bed is plugged off by each filtered particle. The result is that the pressure drop across the sand bed rises continually with use, and when this pressure drop becomes excessive for the particular installation involved, the sand bed must be backwashed to remove the entrained solids before the sand bed can be used for further filtration. In order that these sand beds will have reasonably large capacities, the filter bed is formed by successive layers of particles of successively smaller size. Downward flow is usually used, and the backwash cycle is carried out by upward flow which expands the bed upwardly to loosen and remove the entrained particles. Such a process is objectionable in that the materials being removed, coat the upper surface of the sand bed and all of the surrounding equipment above the bed to provide a very unsanitary and unsightly appearance.

An object of the present invention is the provision of a new and improved method and apparatus for removing colloidal size particles from a liquid in which they are suspended, and which process and apparatus provide a considerably greater capacity than do the conventional sand filters.

Another object of the present invention is the provision of a new and improved method and apparatus for removing colloidal size particles from a liquid in which they are suspended in a more complete and economical manner than has been possible heretofore.

SUMMARY OF THE INVENTION

According to the broader aspects of the invention, all small particles including colloidal size particles are removed from a liquid suspension of the same by flowing the suspension through a bed of material having a pore size no less than approximately 10 times the smallest size particle to be removed, and the material of which has a zeta potential which causes the solids of the suspension to floc when under the influence of the zeta potential of the bed material. In one embodiment of the invention, the liquid suspension is first treated to adjust the zeta potential of the suspended particles to a potential very nearly that at which the particles will floc. The potential provided by the treatment is such, however, as to still hold the particles dispersed throughout the liquid. The treated suspension is then filtered through fibers having a zeta potential which is opposite in charge and magnitude from the zeta potential of the particles. When the treated particles approach the surface of the fibers, the dispersing zeta potential on the particles is counteracted by the zeta potential of the fibers to cause the particles to floc in situ and become attached to the fibers. The fibers can be mixed in with the suspension, but preferably are a fixed bed through which the suspension is passed. The preferred forms of fibers are glass fibers because of the durability, uniformity, and inexpensiveness of glass fibers. Mats of the glass fibers can be made inexpensively to have extremely low densities and uniform pore sizes to provide high filtering capacity with very little pressure drop. Glass fibers have a negative charge in water, and where the particles to be removed are positively charged, the process is simply carried out by adjusting the zeta potential with acid and/or counter ions. Examples of positively charged particles are alumina, thoria, and ferric oxide. Positively charged particles can be deposited upon negatively charged glass fibers without charge reversal and by the adjustment of the zeta potential with pH control and/or counter ions.

Most suspended solids, however, are negatively charged. Examples of negatively charged particles are: organic materials particularly where they have undergone oxidation, colloidal silica, the aluminum silicates, clay, ferrous oxide, and various inorganic refractory materials excluding alumina, thoria and ferric oxide. When the particles of the suspension are negatively charged, the expense of treating the suspension to be filtered can be greatly reduced or eliminated by using a filter bed of material that is positively charged, as for example chromium oxide particles, aluminum oxide particles, thoria oxide particles, and preferably fibers of the same. The hydrous oxides of these materials are positively charged and under some conditions will cause negatively charged suspensions to floc without further treatment. In still other instances, it may be desired to only provide a coating of these materials on other base fibers, as for example stainless steel fibers, or glass fibers.

In those instances where the particles to be removed are negatively charged, the suspension can be treated with a charge reversal agent such as an aluminum hydroxide forming material or a ferric hydroxide forming material, as for example aluminum sulfate or ferric sulfate. Still other charge reversal agents will occur to those skilled in the art.

In one method of carrying out the present invention, the raw liquid containing the solid suspension is caused to flow upwardly through the filter bed. By so doing, optimum filtering conditions are provided requiring minimum backwash flows and providing optimum sanitary conditions both above and below the filter bed.

In another method of carrying out the present invention, particularly useful where the suspension contains large particles of debris which plug the surface of the filter bed, a thin layer of large size sand particles may be placed on top of the fiberous filter bed, and the suspension caused to flow downwardly through the composite bed. With this arrangement, a backwash flowing upwardly through the bed will expand the layer of large size sand particles to remove the troublesome debris.

Also according to the invention, a unique arrangement is provided as well as a unique filter material of great filtering capacity and optimum pore size for carrying out the methods of the present invention.

DESCRIPTION OF THE PREFERRED EMBODIMENTS

Figure 1:
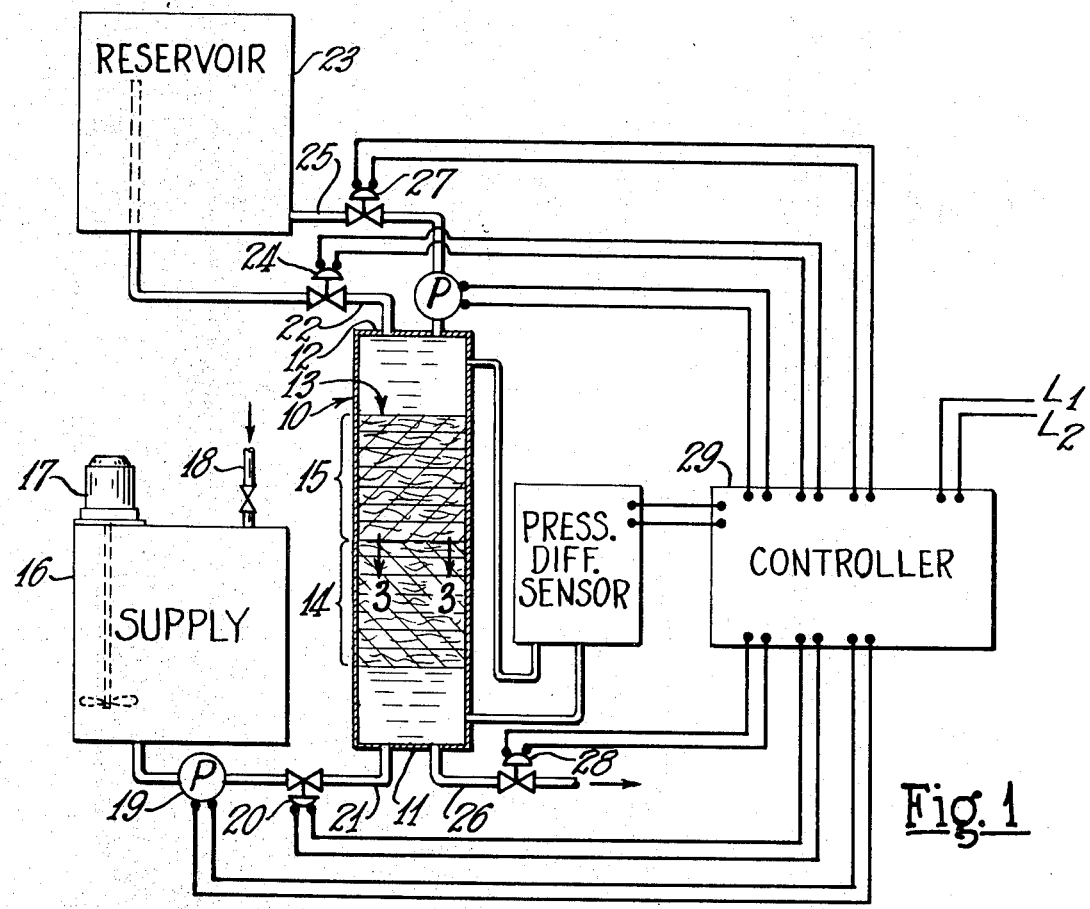
FIG. 1 is a generally schematic view of process equipment for carrying out the principals of the present invention.

The apparatus shown in FIG. 1 comprises a Pyrex column 10 having an inside diameter of 3 inches and a height of 3 feet. Lower and upper closure members 11 and 12 are provided on the lower and upper ends respectively. A bed of filter material 13 fills the cross section of column 10, and in the embodiment shown in the drawing, the bed comprises a lower layer 14 of glass fibers having a low density and an upper layer 15 of glass fibers having a higher density. The apparatus shown includes a mixing tank 16 having a mixer 17 therein, and a water fill pipe 18. Water containing predetermined amounts of solids of predetermined size is removed from the tank 16 by a pump 19 which discharges through a control valve 20 to an inlet line 21 in the lower closure member 11 of the column 10. Any suitable means can be used to provide a predetermined rate of flow, and in the embodiments shown, pump 19 is capable of being driven at various selected speeds. The liquid-solid suspension entering the column 10 passes upwardly through the lower layer 14 of filter material and then through the upper layer 15 of filter material to an outlet conduit 22 in the upper closure member 12. The outlet conduit 22 extends to a filtered water reservoir 23 and has a control valve 24 therein for reasons which will later be apparent. The reservoir 23 is provided with an outlet 25 which communicates with the upper closure member 12 for backwashing the filter. The lower closure member 11 is provided with a drain 26; and the backwash line 25 and drain 26 are provided with control valves 27 and 28, respectively. A differential pressure controller 29 is connected between the lower and upper closure members 11 and 12. Suitable connections are provided between the controller 29 and the control valves 20, 24, 27, and 28 for automatically backwashing the filter bed 13 whenever the pressure drop across the bed exceeds a predetermined value. The controller 29 can also be set to produce backwashing of the filter bed at fixed intervals of time regardless of the pressure drop.

Example 1

Colloidal size particles less than 1 micron in size of an acid ball clay was mixed into a suspension in the tank 16 to provide a solid content of 500 parts per million. Circular disks of a phenol formaldehyde bonded glass fiber board 1/16 inch larger in diameter than the inside diameter of the column 10 were pressed into the column to provide an upper layer 15 ten inches deep. Fibers of the phenol formaldehyde bonded board had a diameter approximately 0.0006 inch, the board had a density of 10 pounds per cubic foot, and the fibers extended generally horizontally of the column. A lower layer 14 of fibers was also used, and this layer was made from specially produced glass fiber mat weighing 2 pounds per cubic foot. The fibers therein also had a diameter of 0.0006 inch and were bonded together by a phenol formaldehyde binder. A 10 inch deep layer having a diameter 1/16 inch larger than the internal diameter of the column was pressed into the column beneath the upper layer 15. The fibers in the lower layer 14 extended generally in vertical parallel planes, and a photograph of the same can be seen in FIG. 3. The pH of the clay suspension prepared as above described was adjusted by the use of hydrochloric acid and/or sodium hydroxide to provide a predetermined pH, and this material was run through the column 10 at a flow rate of 3 gallons per minute per square foot of cross section for 1 hour. Runs of various pH were made and the table below gives the percent of clay which was removed at various pH levels.

| pH: | Clay removed, percent |
| --- | --- |
| 7.9 | 10.0 |
| 7.0 | 23.1 |
| 6.3 | 24.8 |
| 5.5 | 41.3 |
| 5.0 | 93.2 |
| 4.2 | 100.0 |

Example 2

The process of Example 1 was repeated excepting that slurries of an alkaline ball clay of various pH's were made and circulated through the column 10. The table below indicates the amount of the alkaline ball clay which was removed at various pH levels.

| pH: | Clay removed, percent |
| --- | --- |
| 7.0 | 10.0 |
| 6.3 | 12.3 |
| 5.0 | 17.9 |
| 4.2 | 53.8 |

It will be noted that the alkaline ball clay could not be removed completely even at the low pH of 4.2. Another batch of the alkaline ball clay slurry of 500 parts per million and having a pH of 4.2 was made in which the pH was adjusted using sulfuric acid, and in which 5 parts per million of sodium sulfate were added. A hundred percent of this material was removed by the column 10.

Example 3

The process of Example 1 was repeated excepting that a slurry of 500 parts per million of colloidal silica was prepared and the pH adjusted with sulfuric acid. Various runs of this material were made at pH levels of from 4 to 8 during which there was no removal of the silica particles. A suspension of 500 parts per million of the colloidal silica was made and 15 parts per million of $Al_2(SO_4)_3$ plus 5 parts per million sodium sulfate were added and the pH adjusted to 4.2. Complete removal of the colloidal silica was obtained by the column 10.

The 15 parts per million of aluminum sulfate was not sufficient to produce floccing and was used as a charge reversal agent to affect a charge reversal of the silica particles.

Example 4

The process of Example 3 was repeated excepting that 15 parts per million of $Fe_2(SO_4)_3$ was substituted for the aluminum sulfate, and a pH of 4.5 was used. Colloidal silica of this suspension was likewise completely removed by the column 10. The ferric sulfate did not produce coagulation and was used as a charge reversal agent to affect a charge reversal of the silica particles.

Example 5

The column 10 was prepared using a 10 inch deep lower layer 14 of a 5 pound phenol formaldehyde bonded glass fiber board in which the fibers ran horizontally, and a 10 inch deep upper layer 15 of a 10 pound phenol formaldehyde bonded glass fiber board in which the fibers ran horizontally. The tank 16 was filled with the effluent from an activated sludge sewage treatment plant, which was then coagulated using 150 parts per million of $Al_2(SO_4)_3 \cdot 16H_2O$ and 50 parts per million of ball clay. After settling, the floc was drained out of the bottom of the tank, and the remaining liquid was determined to have from between 10 to 75 parts per million of suspended solids. The pH in this suspension was adjusted to a pH of 7 using sulfuric acid and then pumped through the column at a rate of 6 gallons per minute per square foot of cross sectional area. Various runs through the column were made at various pH levels other than 7. At a pH of approximately 4.5, the effluent from the filter bed had less than 0.04 part per million of suspended solids.

The aluminum sulfate used in this example not only produced the coagulation which removed the larger size particles from the suspension, but also acted as a charge reversal agent to produce a charge reversal of the negatively charged organic and inorganic particles which remained in a suspended form after the floccing treatment.

Example 6

The tank 16 was filled with industrial waste water containing both treated sewage and chemical waste. This suspension had a turbidity of 8.5 parts per million and a pH of 7.5. The suspension was treated with 25 parts per million of $Al_2(SO_4)_3 \cdot 16H_2O$ and adjusted to a pH of 6.7 and run through the filter 10 at a rate of 6 gallons per minute per square foot of cross sectional area. The filtrate had a turbidity of less than 0.04 part per million. When this same suspension was not treated with the aluminum sulfate, but was run through the column at a pH of 7.5, the filtrate had a turbidity of 2.5 parts per million.

The aluminum sulfate was not used in sufficient quantity to produce coagulation, but was used as a charge reversal agent to affect a charge reversal of the organic sewage particles.

Example 7

The process of Example 5 was repeated using a suspension of 50 parts per million of clay particles less than 1 micron in size in well water. The pH of the suspension was adjusted with sulfuric acid to a pH of approximately 5.0. The apparatus shown in FIG. 1 was arranged to automatically backwash every 5 hours at a rate of 18 gallons per minute per square foot of cross sectional area for 2 minutes. The effluent produced by this arrangement had a turbidity of less than 0.04 part per million, the pressure drop across the filter increased from less than 0.5 pound per square inch to 1.5 pounds per square inch during the 6 hour period, and the backwash cycle restored the bed to its original pressure drop versus flow relationship.

The filter material 15 used in the above examples had a density of 10 pounds per cubic foot, was arranged so that the flow was generally crosswise to the fibers. The pore size, or the distance between the fibers in this material has been calculated to be approximately 82 micron. It will therefore be seen that the filter material does not remove the suspended solids in the conventional manner, but that the solids are coagulated in situ and drawn to the surface of the glass fibers. This action only occurs when the zeta potential of the solids in the suspending liquid is caused to be close to that at which the material coagulates and is of an opposite charge from that of the fiber filter material. The charge on the fibers causes the zeta potential of the solids suspended in the liquid to be counteracted as it approaches the fibers so that the particles coagulate together. The coagulating particles are drawn to the surface of the fibers where they are retained without filling the space between the fibers or closing off the flow channels. There is, therefore, no appreciable build-up in pressure drop as occurs in conventional filters. The above examples clearly show that glass fibers which are negatively charged can be used to remove negatively charged particles by use of a charge reversing agent. Glass fibers, therefore, are a preferred filter material which can be universally used. Where pretreatments are to be avoided, however, it may be desirable to use positively charged fibers to remove negatively charged particles.

Figure 3:
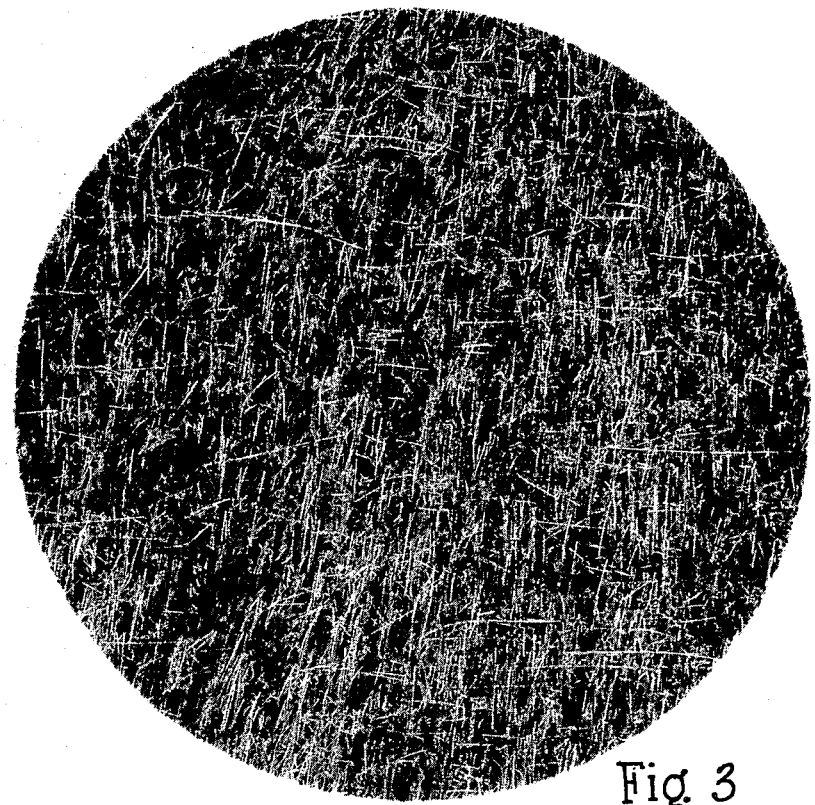
FIG. 3 is an enlarged photograph of novel filter media for the practice of the present invention.

The second layer of less dense fibers is not necessary in all instances, but work with the present invention has shown that the cycle life of the main filter bed can be greatly increased by first passing the suspension through a bed of fibers having a density of from 2 to 8 pounds per cubic foot, and preferably one in which the fibers extend generally parallel to the flow. Such a material removes the larger size particles which would not be removed mechanically by screens, etc. and which would collect on the inlet face of the main filter bed. This material must be specially constructed to have the desired density, and at 5 lbs./ft.$^3$ density has a pore size of approximately 166 microns, and at 2.5 pound density has a pore size of approximately 2500 micron. By having the fibers run lengthwise to flow, long straight channels are provided. Such a material is shown in FIG. 3. Most preferably the material has a density of between 4 and 6 pounds per cubic foot.

Figure 2:
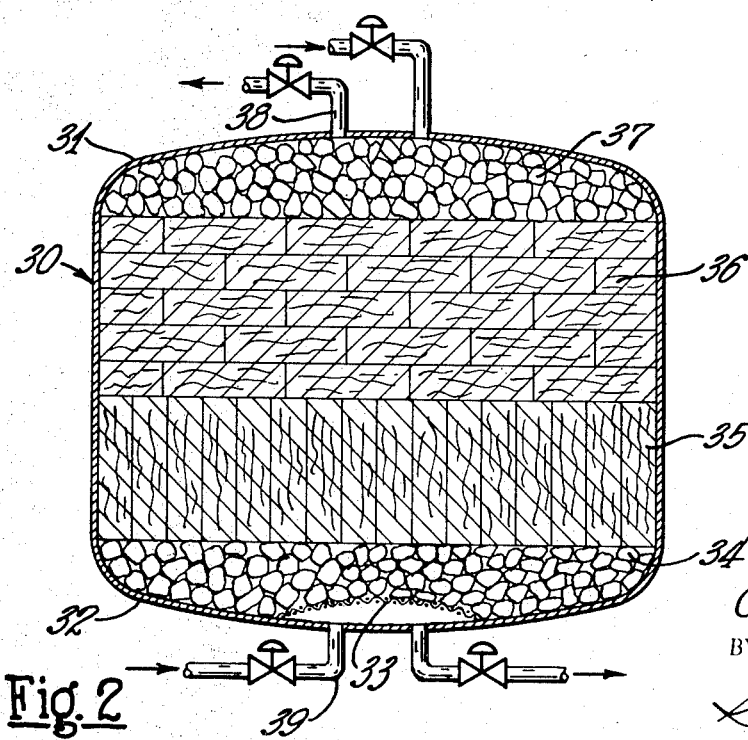
FIG. 2 is a cross sectional view through another embodiment of filter bed for practicing the invention on a large scale.

FIG. 2 is a cross sectional view of filter apparatus having large capacity. The apparatus shown comprises a cylindrical tank 30 having upper and lower dished heads 31 and 32. The tank is provided with a screen grid 33 on top of which a layer 34 of aggregate is supported. The aggregate may be ¾ inch diameter glass marbles. A layer 35 of blocks of the material shown in FIG. 3 is supported on top of the layer of marbles 34. The fibers of this material extend lengthwise of each block. The blocks are 3 inches thick, 6 inches wide and 10 inches long, and are packed together with their length extending vertically. Ten pound/ft.$^3$ phenol formaldehyde bonded glass fiber boards 36 are placed on top of the layer of blocks 35 with their sides in abutting engagement. These blocks are approximately 2 inches thick, 12 inches wide and 12 inches long, and additional layers are laid on top of the lower initial layer to form a total depth of approximately 10 inches. These layers of blocks are arranged so that the joints of one layer are positioned intermediate the edges of the blocks of adjacent layers, as is done when laying brick. Aggregate which may be a 12 inch layer of ¾ inch glass marbles 37 is laid on top of the 10 pound filter material to hold the same in place, and the upper and lower heads 31 and 32 are provided with outlet and inlet connections 38 and 39 respectively so that the unit can be connected to the usual filter plant piping.

The phenol formaldehyde binder which holds the fibers of the mat together, weakens or deteriorates slightly when submerged in water. Since the fibers are held together under a light amount of compression when the binder is hardened, the blocks of fiber expand slightly during use to fill in the voids between the blocks. Other types of binders can be used to perform the same function, as for example any phenolic resin binder, polyester binders, polystyrene binders, etc.

EXAMPLE 8

An 18 inch square steel tank 40 (FIG. 4) having a closed bottom 41 is provided with a screen subfloor 42 supported in space relation from the bottom 41 by the structural supports 43. An inlet connection 44 is provided in the bottom 41, and a side outlet T 45 is connected thereto. A valve 46 is positioned at one side of the T and this valve is normally open to communicate flow out of the filter to the filtered water conduit 47. A valve 48 is provided on the opposite side of the T 45 for communicating a backwash feed conduit 49 to the outlet 44. A first layer of filter material 50 formed from 3 inch thick by 6 inch wide by 10 inch long fiberboards having a density of 10 lbs. per cubic foot, and the fibers of which run lengthwise of the block are stacked on end upon the screen 42. A second layer 51 of filter material is made from correspondingly shaped blocks which are stacked on end on top of the layer 50 with the fibers of the layer 51 also running lengthwise of the board. The blocks forming the layer 51 have a density of 5 pounds per cubic foot and are made from glass fibers having a diameter in the range of 0.0015 to 0.0020. The bottom layer is made from fibers having a diameter of 0.00060 inch. Flow through the filter layers 50 and 51 is downwardly, and in order to prevent debris from accumulating on the top surface of the layer 51 to plug up the pores of the layer 51, a three inch layer of number 6 to number 10 screen sand is placed on the upper surface of the layer 51. The raw water to be filtered enters through the valved inlet conduit 52, and the backwash exits through valved conduit 53.

The effluent from an extended sewage treatment plant having suspended organic particles therein in a concentration of a hundred parts per million is flowed through the filter 40 at a flow rate of 12 gallons per minute per square foot through the inlet connection 52 and out through the outlet 47. Before entering the filter 40, the raw water to the filter was pretreated with 25 parts per million of alum and 2.5 parts per million of sodium silicate, with no pH adjustment. The raw water entering the filter had a pH of 7. Ninety-nine+ percent of the suspended solids in the raw water feed to the filter were removed. The removed solids had a particle size of from 0.5 to 100 micron. A certain amount of large size debris is collected on top of the sand layer 54, and after a run of 5 hours, this debris was removed by backwashing the filter by flow through the conduit 49 and out through the conduit 53 at a flow rate of 45 gallons per minute per square foot. The said layer 54 was expanded and the debris romoved, and when the filter was placed back on stream again, it had substantially the same pressure drop that it did initially.

In general, the glass fiber used to form the first layer through which the water passes preferably had a density of from approximately 2 to approximately 8 pounds per cubic foot and the second layer to be contacted by the liquid preferably has a density between approximately 5 pounds to approximately 15 pounds per cubic foot. The fibers of the first layer will preferably have a diameter between approximately 0.001 and approximately 0.002 inch, and the fibers of the second layer to be contacted by the fluid will preferably have a diameter between approximately 0.00045 and approximately 0.00080 inch. The glass used in above examples has a density of 160 pounds per cubic foot, and were an alumima borosilicate glass composition.

Aluminum coated glass fibers is one type of coated fiber which can be used to remove negatively charged particles. The aluminum oxidizes to provide a coating of aluminum oxide. The zeta potential of these fibers can be adjusted or made more positive by treating the aluminum coated glass fibers forming the bed with a thorium nitrate solution. The solution is drained from the fibers and the bed partially dried, following which a moist ammonia gas is flowed through the bed and the fibers dried to give integrity to the coating. The bed of fibers can then be used or placed back in service again.

The following formula can be used to calculate pore size when the density of the material forming the fiber, the fiber diameter, and the density of the fiberboard is known:

$$Lf(\text{pore size}) = \frac{\pi \cdot P_f}{4 \cdot P_p} \cdot d$$

Where:

$P_f$ is the density of the material of the fibers;
$P_p$ is the density of the board and
$d$ equals the diameter of the fibers.

Using this formula, glass fiberboard made from fibers having a diameter of .0006 inch has a pore size of approximately 2,500 micron at a board density of 2.5 pounds per cubic foot, a pore size of approximately 166 micron at a board density of 5 pounds per cubic foot, and a pore size of approximately 82 micron at a board density of 10 pounds per cubic foot.

Figure 4:
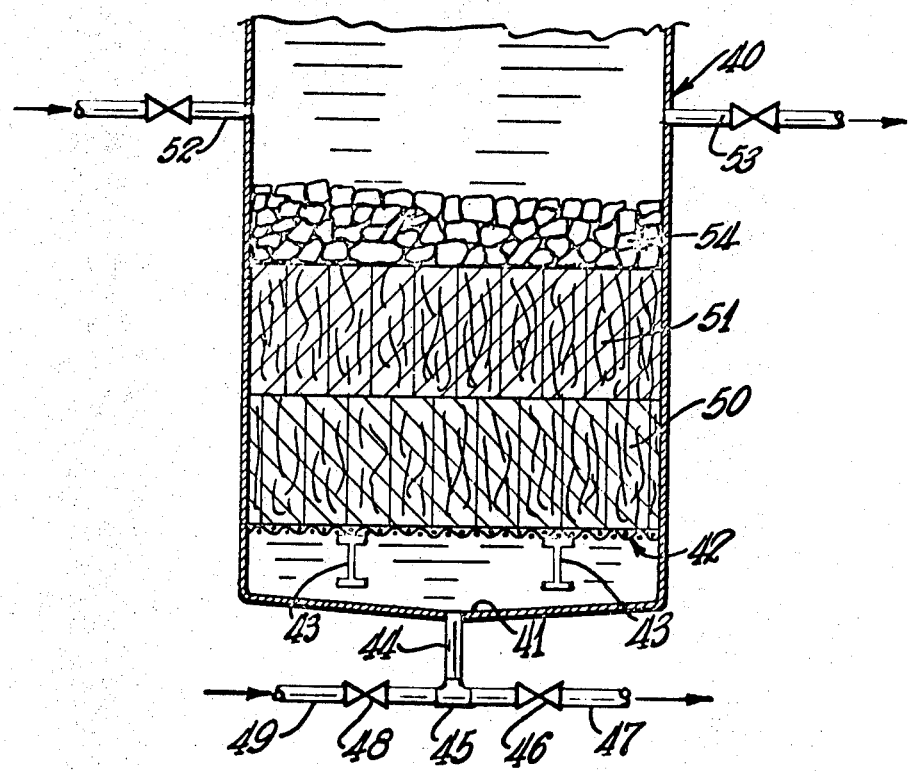
FIG. 4 is a cross sectional view through another embodiment of filter bed for practicing the invention.

It has been found that filter beds of fibers will have greater filtering capacity when the fibers are arranged lengthwise to flow, and that a longer time between backwashes can be had if large size debris is prevented from plugging the inlet surface of the fiber bed. Such an arrangement is shown in FIG. 4 of the drawings. Usually, a backwash flow rate of between approximately 3 and 5 times the filter rate will be adequate, but in some instances a higher backwash rate may be desirable.

While the invention has been described in considerable detail, I do not wish to be limited to the particular embodiments shown and described, and it is my intention to cover hereby all novel adaptations, modifications, and arrangements thereof which come within the practice of those skilled in the art to which the invention relates.

I claim:

1. A method of removing solids from a suspension having particles of a size below a predetermined value and a given zeta potential, said method comprising: providing a bed of material having a pore size no less than approximately 10 times the smallest particles to be removed and having a zeta potential when contacted by the suspension of a charge different from that of the particles to be removed by a magnitude which will lower the potential between the particles below the coagulation point of the particles when the particles are brought within the effect of the zeta potential of the material, and flowing the suspension through the bed at a flow rate below that at which the particles coagulated by the zeta potential of the material adhere to the material of the bed.

2. The method of claim 1 wherein the zeta potential of the particles of the suspension is first adjusted to a low value above the zeta potential which causes coagulation in the liquid and so that the bed of material coagulates the particles having the adjusted zeta potential.

3. The method of claim 1 wherein the zeta potential of the material of the bed is first adjusted to cause the solids to floc in the presence of the particles.

4. The method of claim 1 wherein the material of the bed is fibers.

5. The method of claim 3 wherein the material of the bed is positively charged.

6. The method of claim 5 including the step of: treating the particles to provide a coating of positively charged ions.

7. The method of claim 5 wherein the material of the bed is aluminum coated glass fibers.

8. A method of removing solids of a given charge from a liquid in which the solids are suspended, said method comprising: adjusting the zeta potential of the solids in the liquid to a low value above the zeta potential which would cause floccing in the liquid, and flowing the adjusted suspension through a bed of fibers having a zeta potential when contacted by the suspension of a different value from that of the solids, the zeta potential of the fibers together with the zeta potential of the solids being sufficient to cause floccing of the solids in situ adjacent the fibers, said bed of fibers having a pore size at least ten times the particle size of the smallest particles to be removed.

9. The method of claim 8 wherein the adjusting of the zeta potential is accomplished by adjusting the pH.

10. The method of claim 8 wherein both the solids and the fibers have a negative zeta potential, and the adjusting step comprises the addition of a charge reversal agent to the suspension.

11. The method of claim 10 wherein the adjusting step also includes the addition of acid to adjust pH between approximately 4 and approximately 7.

12. The method of claim 9 wherein the adjusting step also includes the addition of divalent or trivalent counter ions.

13. A method of removing solids suspended in a liquid comprising: adding charge reversal agents to the suspension in an amount between approximately 0.01 to approximately 1.0 times the amount of the solids to be removed to provide a positive zeta potential on the solids which prevents coagulation of the solids; treating the suspension by adjusting its pH from between approximately 4 to approximately 7, and by adding counter ions in an amount from 0 to approximately 50 p.p.m. to provide a zeta potential on the solids at which a glass will cause coagulation; and flowing the treated suspension through a bed of fibers of said glass, which bed has a pore size at least approximately 10 times that of the smallest solids to be removed to floc the solids on the fibers.

14. The process of claim 13 wherein the suspension is caused to flow upwardly through the bed of fibers for a period of time, following which the floc is removed by a downward flow of liquid through the bed at a rate of from approximately 3 to approximately 5 times the upward flow rate.

15. The method of claim 8 wherein the bed is formed by a plurality of layers of abutting blocks of glass fibers, said blocks comprising: glass fibers most of which lay in planes parallel to one surface of the blocks with the fibers being held together at cross over points by a phenol formaldehyde resin binder, the blocks having a pack density of from approximately 2 lb./ft.$^3$ to approximately 15 lbs./ft.$^3$.

16. The method of removing solids of a given charge from a liquid in which the solids are suspended by means of glass fibers having a given zeta potential when in contact with the suspension, said method comprising: adjusting the zeta potential of the solids in the liquid to a value of the same sign and which is closer to the zeta potential which causes floccing of the solids in the liquid than is the zeta potential of the fibers when in contact with the liquid, and contacting the adjusted suspension with the glass fibers to induce floccing of the solids when in proximity to the fibers.

17. The method of removing solids of a given charge from a liquid in which the solids are suspended by means of glass fibers having a given zeta potential, said method comprising: treating the liquid with a charge reversal agent and adjusting the zeta potential of the solids in the liquid to a value that is closer to the zeta potential which causes floccing of the solids in the liquid than is the zeta potential of the fibers when in contact with the liquid, contacting the adjusted suspension with the glass fibers to induce floccing of the solids when in proximity to the fibers, and separating the floc so produced from the fibers.

18. The method of removing colloidal particles of a given charge from liquid in which the particles are suspended, said method comprising: adjusting the zeta potential of the colloidal size particles in the liquid with ions to a value closer to the zeta potential which causes floccing of the colloidal size particles in the liquid, but which value still keeps the colloidal size particles from floccing, and contacting the liquid with nonfloccing filter bed-forming solids of a size large enough to catch and hold a floc and having a zeta potential when contacted by the suspension of a different value than the zeta potential of the colloidal size particles, the zeta potential of the nonfloccing solids being sufficient to cause floccing of the colloidal size particles when they come within the field of the zeta potential of the nonfloccing solids, and causing the floc so produced to settle out on and be retained by a filter bed formed by said nonfloccing filter bed-forming solids.

19. The method of claim 18 wherein the zeta potential of the nonfloccing solids are of opposite charge to cause the flocced solids to adhere to the nonfloccing solids.

20. The method of claim 18 including the treatment of one of the solids with a charge reversal agent.

21. The process of claim 20 wherein the nonfloccing solids have a negative zeta potential, and the adjusting step includes the addition of a charge reversal agent to the liquid suspension.

References Cited

UNITED STATES PATENTS

| | | | |
|---|---|---|---|
| 2,036,258 | 4/1936 | Cummins | 210—506 X |
| 2,995,434 | 8/1961 | Burton | 71—8 X |
| 3,061,107 | 10/1962 | Taylor | 210—506 X |
| 3,131,144 | 4/1964 | Nagan | 210—54 |
| 3,192,154 | 6/1965 | Burton | 210—17 X |
| 3,209,916 | 10/1965 | May et al. | 210—489 X |
| 3,210,229 | 10/1965 | Feine | 210—489 X |
| 3,347,391 | 10/1967 | Steensen | 210—496 X |

OTHER REFERENCES

Black, A. P.: The Chemistry of Water Treatment, Water & Sewage Works, April 1948, pp. 142–144.

Riddick, T. M.: Zeta Potential and its Application to Difficult Waters, Jour. AWWA, vol. 53, August 1961, pp. 1007 through 1019 and 1027–1030 relied on.

MICHAEL E. ROGERS, Primary Examiner

U.S. Cl. X.R.

210—51, 491, 509